(12) United States Patent
Fujimura

(10) Patent No.: US 7,953,700 B2
(45) Date of Patent: May 31, 2011

(54) HOME PAGE AUTOMATIC UPDATE SYSTEM AND HOME PAGE AUTOMATIC UPDATE METHOD

(75) Inventor: Yoshiki Fujimura, Machida (JP)

(73) Assignee: Information Online Co., Ltd., Tokyo (JP)

( * ) Notice: Subject to any disclaimer, the term of this patent is extended or adjusted under 35 U.S.C. 154(b) by 550 days.

(21) Appl. No.: 10/672,622

(22) Filed: Sep. 26, 2003

(65) Prior Publication Data
US 2004/0064446 A1    Apr. 1, 2004

(30) Foreign Application Priority Data
Sep. 27, 2002    (JP) ................................. 2002-284121

(51) Int. Cl.
G06F 7/00         (2006.01)
G06F 17/00        (2006.01)
(52) U.S. Cl. ........................ 707/618; 707/694
(58) Field of Classification Search ............... 707/2, 10, 707/101, 104.1; 704/14
See application file for complete search history.

(56) References Cited

U.S. PATENT DOCUMENTS

| | | | | |
|---|---|---|---|---|
| 5,937,160 A  * | 8/1999 | Davis et al. | ................... | 709/203 |
| 2002/0082914 A1* | 6/2002 | Beyda et al. | ................... | 705/14 |
| 2002/0128904 A1* | 9/2002 | Carruthers et al. | ............. | 705/14 |
| 2004/0015608 A1* | 1/2004 | Ellis et al. | .................... | 709/246 |

FOREIGN PATENT DOCUMENTS

| | | | |
|---|---|---|---|
| CA | 2303466 A1 | * | 9/2001 |
| JP | 10-040148 | | 2/1998 |
| JP | 10/40148 | | 2/1998 |
| JP | 2000-276417 | | 10/2000 |
| JP | 2001-325144 | | 11/2001 |
| JP | 2001-350690 | | 12/2001 |
| JP | 2002-7463 | | 1/2002 |
| JP | 2002-91864 | | 3/2002 |
| JP | 2002-109357 | | 4/2002 |

OTHER PUBLICATIONS

Search report from corresponding JP 2002-284121 dated Sep. 16, 2008.

* cited by examiner

*Primary Examiner* — Michael J Hicks

(74) *Attorney, Agent, or Firm* — Ohlandt, Greeley, Ruggiero & Perle, L.L.P.

(57) ABSTRACT

A home page automatic update system includes home page management means for reading out an HTML document from a home page database in response to a request from a user terminal, and transmitting the readout HTML document to the user terminal, patrol search means for extracting update data by executing in turn a reception process of a mail message stored in a mail server, an extraction process of update data of an HTML document stored in the home page database, a file search process in a personal computer, and a search process of schedule data in a storage device on the basis of a priority order, and banner data generation means for generating update HTML data on the basis of the extracted update data. The home page management means transmits an HTML document which contains the update HTML data generated by the banner data generation means to the user terminal.

5 Claims, 4 Drawing Sheets

Today is (month) (day).  [Submit] [Back]

| Today | Today's bargain: Sunflower (100 yen for one) |
|---|---|
| Tomorrow | Cut flower preservative ~~600 yen~~ → 400 yen |

| Password |
|---|

Flower shop ○○
042-723-○○○○

| Mon | Described in today's field Contents of this space will be displayed a week later |
|---|---|
| Tue | Described in tomorrow's field Contents of this space will be displayed a week later |
| Wed | Closed today We'll be open tomorrow |
| Thu | Bouquet 500 yen → 350 yen |
| Fri | Winter cherry pot 1400 yen |
| Sat | Lily 170 yen |
| Sun | Carnivorous plants now in stock Good for your children to observe for summer holiday's homework |

○ Banner display help    ○ Live cast

| Always | Coupon ticket 10% off |
|---|---|
|  |  |

} For entrant

} Management window (for supervisor)

FIG. 3

HOME PAGE AUTOMATIC UPDATE SYSTEM AND HOME PAGE AUTOMATIC UPDATE METHOD

CROSS-REFERENCE TO RELATED APPLICATIONS

This application is based upon and claims the benefit of priority from the prior Japanese Patent Application No. 2002-284121, filed Sep. 27, 2002, the entire contents of which are incorporated herein by reference.

BACKGROUND OF THE INVENTION

1. Field of the Invention

The present invention relates to a home page automatic update system and home page automatic update method, which can easily automatically update a home page.

2. Description of the Related Art Conventionally, in order to update a home page, update data are stored in a database in correspondence with a predetermined schedule (e.g., to update information A on x/y, to update information B on x/z, and so forth), and the update data are read out in correspondence with the schedule to automatically update the home page. This update method is disclosed in, e.g., Jpn. Pat. Appln. KOKAI Publication No. 10-40148.

However, with the aforementioned method, update data must be periodically registered, and data to be uploaded are merely registered a predetermined time period before the scheduled time. Hence, the data input process required to update the home page is substantially the same as that required to update the home page in real time.

BRIEF SUMMARY OF THE INVENTION

It is an object of the present invention to provide a home page automatic update system and home page automatic update method, which can easily automatically update a home page.

According to one aspect of the present invention, there is provided a home page automatic update system comprising a home page management unit reading out an HTML document from a home page database in response to a request from a user terminal, and transmitting the readout HTML document to the user terminal, a patrol search unit extracting update data by executing in turn a reception process of a mail message stored in a mail server, an extraction process of update data of an HTML document stored in the home page database, a file search process in a management terminal, and a search process of schedule data in a storage device on the basis of a priority order, and an update data generation unit generating update HTML data on the basis of the extracted update data, wherein the home page management unit transmits an HTML document which contains the update HTML data generated by the update data generation unit to the user terminal.

The present invention associated with the system (apparatus) is also implemented as an invention of a method implemented by that apparatus.

The present invention associated with the apparatus or method is also implemented as a program for making a computer execute a sequence corresponding to that invention (or making a computer function as means corresponding to the invention, or making a computer implement functions corresponding to the invention), and a computer readable recording medium that records the program.

BRIEF DESCRIPTION OF THE SEVERAL VIEWS OF THE DRAWING

FIG. 3 shows an example of a data registration window according to the embodiment shown in FIG. 1;

DETAILED DESCRIPTION OF THE INVENTION

A preferred embodiment of the present invention will be described hereinafter with reference to the accompanying drawings. The embodiment to be described hereinafter will exemplify a case wherein an automatic update process of a home page of a given shopping street is managed. In this embodiment, a home page (WEB page) includes not only a first page based on an HTML document provided from a WWW server upon accessing the WWW server, but also an information page which follows the first page.

Figure 1:
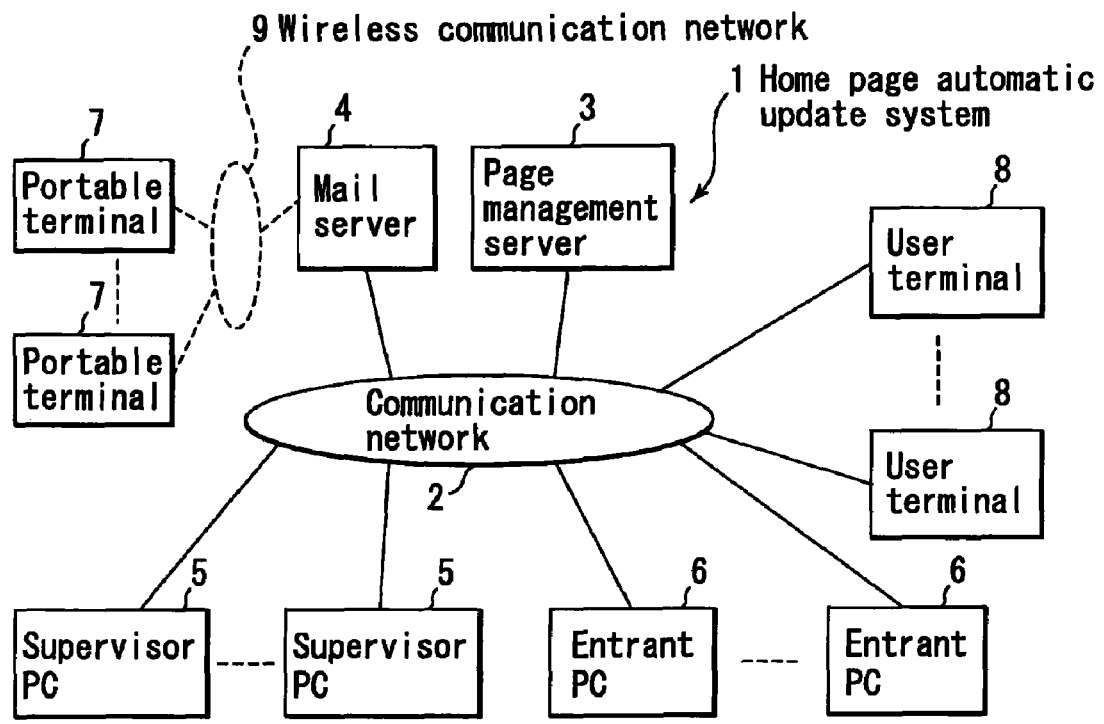
FIG. 1 is a diagram showing the overall arrangement of a home page automatic update system according to an embodiment of the present invention.

FIG. 1 shows the overall arrangement of a home page automatic update system according to an embodiment of the present invention.

As shown in FIG. 1, a home page update system 1 comprises a page management server 3, mail server 4, supervisor personal computers 5, and entrant personal computers 6, all of which are connected to a communication network 2. The mail server 4 can store mail messages sent from portable terminals 7 via a wireless communication network 9. The page management server 3 transmits an HTML file to each user terminal 8 in response to a request from that user terminal 8.

The page management server 3 is managed by a management body of this home page automatic update system 1. The mail server 4 manages mail messages exchanged between the management body, and other terminals and servers. The supervisor personal computers 5 are terminals used by supervisors, and the entrant personal computers 6 are terminals used by entrants. Note that the supervisor indicates a person who collectively manages the home page of the shopping street, and corresponds to a representative elected from, e.g., the shopping street. Also, the entrant is a person who wants to have an advertisement on the home page of the shopping street, and corresponds to a shopkeeper who belongs to the shopping street. The portable terminals 7 are, for example, portable telephone terminals and portable information terminals (PDAs) used by the entrants and supervisors. The user terminals 8 are used by end users who browse the home page.

Figure 2:
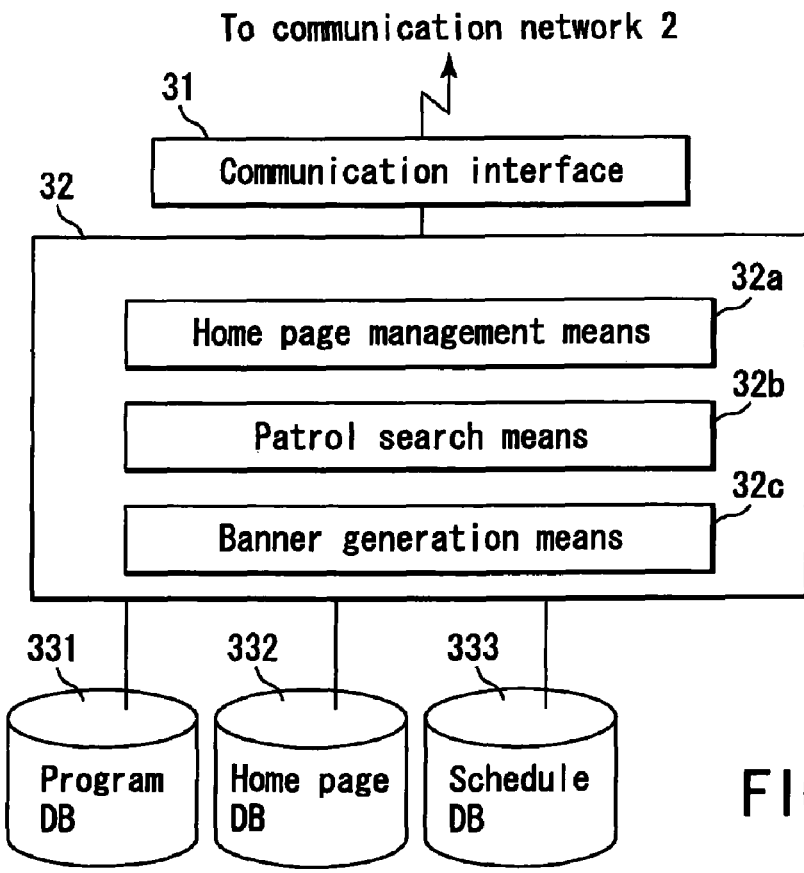
FIG. 2 is a block diagram showing the detailed arrangement of a page management server according to the embodiment shown in FIG. 1.

FIG. 2 is a block diagram showing the detailed arrangement of the page management server 3. As shown in FIG. 2, the page management server 3 comprises a communication interface 31 and a processor 32 connected to the communication interface 31. The processor 32 serves as home page management means 32a, patrol search means 32b, and banner generation means 32c by reading out a program stored in a program database (DB) 331 connected to the processor 32. Note that the processor 32 may serve as the means 32a to 32c by reading a program stored in a recording medium via a recording medium reader (not shown) connected to the processor 32. A home page database 332 and schedule database 333 are connected to the processor 32.

The home page management means 32a implements a function of a WEB server that transmits an HTML document in response to a request from a WEB browser, and comprises, e.g., a CGI (Common Gateway Interface) and the like.

More specifically, the home page management means 32a reads out HTML data in accordance with a request with URL address transmission from a browser of the user terminal 8, and transmits that data to the user terminal 8. The user terminal 8 reads out the received HTML file via the browser, and displays the home page. The function of this home page management means 32a is that implemented by a normal WEB server.

The HTML data to be transmitted in response to the request is transmitted not as an HTML document itself which is registered by the supervisors and entrants but as a file obtained by embedding a banner advertisement in the registered HTML document. More specifically, banner HTML data required to display a separately generated banner advertisement is appended to HTML data, and that HTML data is transmitted to the user terminal. The user terminal 8 reads out the requested HTML data, and displays the home page on its display.

The home page management means 32a updates the home page in accordance with a page update request from each supervisor personal computer 5 or entrant personal computer 6. More specifically, the home page management means 32a updates an existing HTML file by an HTML file transmitted from the supervisor personal computer 5 or entrant personal computer 6. The HTML file before update is saved in the home page database 332 for a patrol search.

The home page management means 32a appends banner HTML data generated by the banner generation means 32c to an HTML document, and transmits that HTML document to the user terminal 8.

The patrol search means 32b searches in turn for update information used in a banner advertisement embedded in the home page. This patrol search process searches four different data resources for update data used to generate an ad.

In the patrol search process, the patrol order is determined on the basis of a predetermined priority order. A case will be exemplified below wherein the patrol order of the mail server 4, home page, PC, and schedule data is set in descending order of priority.

A search process of the mail server 4 with the highest priority is executed first. More specifically, a mail box of the mail server 4 is searched. For example, in case of the patrol search process of a banner advertisement to be embedded in the home page of a given shopping street, whether or not a mail message associated with identification information that pertains to the home page of the shopping street is stored is searched based on that identification information. As the identification information, for example, an ID, password, URL addresses, and the like may be used as along as a mail message that pertains to the home page of the shopping street can be confirmed. That is, the patrol search means 32b of the page management server 3 issues a search request by transmitting identification information to the mail server 4. The mail server 4 searches for a mail message that matches the received identification information. If a mail message that pertains to the shopping street is found as a result of the search, the mail server 4 sends that mail message to the page management server 3. The patrol search means 32b generates banner HTML data on the basis of document data, still picture file, movie file, and the like contained in the received mail message. If no mail message is found as a result of the search, the patrol search means 32b conducts a search process of the home page set as the next patrol turn.

Note that the mail search process may use mail transmission date & time data and the like as a reference upon extracting a mail message. For example, when the mail transmission date & time data indicates a time 48 hours or more before the current time, banner generation based on that mail message may be inhibited. As a result, a banner advertisement is always generated based on the latest information without using any old information.

The home page search process executes an extraction process of an updated part of the home page registered by the shopping street. This extraction process can be set not to extract the updated part of an old update time by setting the update time as an extraction reference. In this way, a banner can always be generated based on latest update information. More specifically, for example, HTML documents before and after update are compared to determine for, e.g., each tag, if they contain mismatched data items. If mismatched data items are found, it is determined that the data item is updated data, and the data item is extracted. A banner advertisement is generated based on the extracted updated data. If the update time of the HTML document before update is 48 hours or more before, e.g., that upon update, such document is not recognized as an updated document, and no data is extracted. For example, if the update time of the HTML document before update is 48 hours or more before, since no updated part is extracted, a search process of the personal computer 5 or 6 set as the next patrol turn is executed.

The search process of the personal computer 5 or 6 checks if the personal computer 5 or 6 stores a file designated in advance. If the designated file is stored, that file is received from the personal computer 5 or 6. Banner HTML data is generated based on that received data. As a search method of the personal computer 5 or 6, for example, a right to access the personal computer 5 or 6 via the communication network 2 is acquired (more particularly, for example, an ID or password is acquired), and a file search command is sent to the personal computer 5 or 6 based on that right to access. The personal computer 5 or 6 searches its internal hard disk, a recording medium set to be readable by the recording medium reader, and the like, for a file designated in advance on the basis of the received file search command. If a file designated by the command is found as a result of the search, that file is transmitted to the page management server 3. If no file is found, a search result indicating that no file is found is sent to the page management server 3. Upon reception of the file, banner HTML data is generated based on that file. Upon reception of the search result indicating that no file is found, a search process of schedule data as the next patrol turn is executed.

The search process of schedule data extracts ad data fit into a schedule corresponding to that search time. Banner HTML data is generated based on that ad data.

This schedule data can be registered by data registration from the personal computer 5 or 6. The patrol search means 32b executes a data registration process of the schedule data. More specifically, upon reception of a data registration request from the personal computer 5 or 6, the patrol search means 32b transmits a data registration window shown in, e.g., FIG. 3 to the personal computer 5 or 6. In the example shown in FIG. 3, registration data fields of today and tomorrow and registration data fields which circulate daily from Monday to Sunday in a week are displayed. When the user inputs, e.g., "today's bargain: sunflower (100 yen for one)", as shown in FIG. 3, using the personal computer 5 or 6, and clicks a register request button, that input data is transmitted to the page management server 3. The page management server 3 stores the received input data in correspondence with a predetermined schedule as, e.g., today's data, tomorrow's data, Monday's data, and so forth. Note that data may be registered from the portable terminal 7.

When the patrol turn of the search process of schedule data is reached, the input schedule data that matches the current time of the search process is read out, and banner HTML data is generated based on the readout data.

Figure 4:
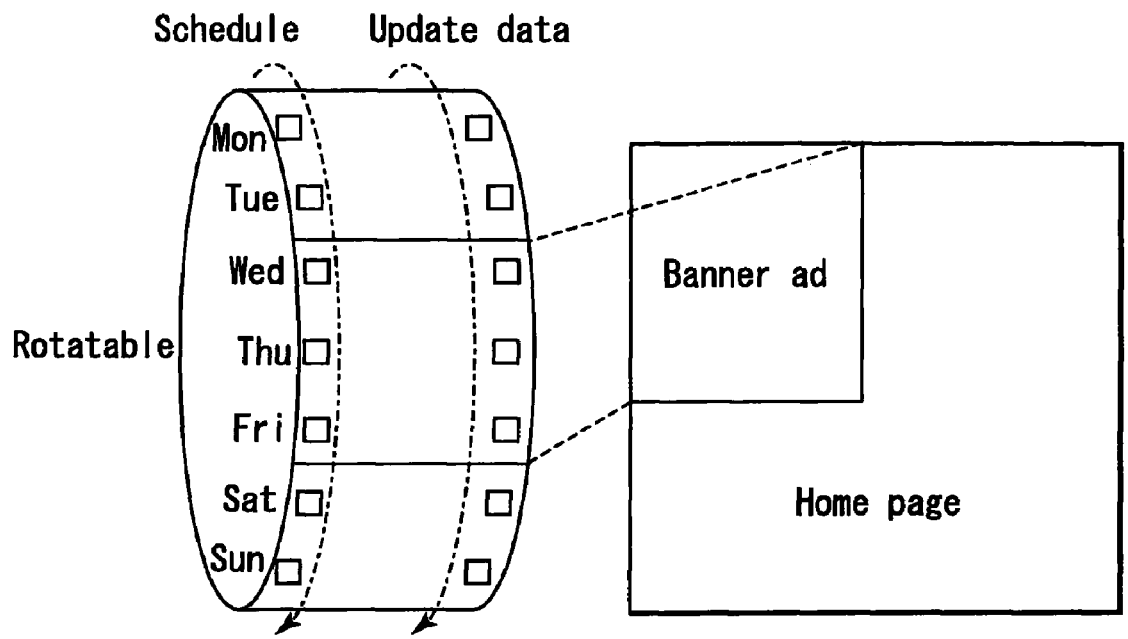
FIG. 4 shows the concept of schedule data according to the embodiment shown in FIG. 1.

FIG. 4 shows the concept of the schedule data. As shown in FIG. 4, schedule data are embedded like a rotating cylindrical film. Schedules are set in the circumferential direction of the cylinder, and when a given schedule matches the current time, schedule data corresponding to that film is read out. The schedule has a schedule setting period such as, e.g., one week, one month, or the like. The schedule setting period is set to return to the first date if it is traced from the first date to the last date. For example, when the schedule setting period is set to be one week, it is set to return to Monday if it is traced from Monday to Sunday. Update data are stored in correspondence with these dates. In this way, a story is determined from the beginning, and the patrol search means 32*b* circulates it to make schedule adjustment. Unlike in the conventional process that uploads an updated home page on a scheduled date and time, new schedule data need not be endlessly registered in correspondence with all future dates, and the home page update process is simplified very much.

The banner generation means 32*c* generates banner HTML data based on the search result of the patrol search means 32*b*. The generated banner HTML data is transmitted to the user terminal 8 together with an HTML document that the user requests. In this way, a banner advertisement generated by the banner generation means 32*c* is also displayed on the home page displayed on the display of the user terminal 8.

The operation of the aforementioned home page automatic update system 1 will be described below.

For example, shopkeepers of a given shopping street are registered as entrants, and a supervisor is elected from these shopkeepers. The supervisor generates a home page that includes introductions of respective shops as an HTML document, and transmits the HTML document to the page management server 3 together with other attached files such as a still picture file, movie file, audio file, and the like to be displayed on the home page. The home page management means 32*a* of the page management server 3 stores the received HTML document and attached files in the home page database 332 in association with an identification code of that shopping street (shopping street identification code) and the date of registration. Note that the supervisor can register the HTML document and attached files all the time. The page management server 3 stores old and new data by giving dates of registration every registration. In this way, HTML documents from the latest one to those before update can be retrieved.

The page management server 3 transmits the data registration window shown in, e.g., FIG. 3 to the supervisor personal computer 5 or entrant personal computer 6 to prompt the supervisor or entrant to input schedule data. The supervisor or entrant inputs schedule data to be displayed today and tomorrow, schedule data displayed weekly from Monday to Sunday, and the like, as shown in FIG. 3. The input schedule data are transmitted to the page management server 3. The page management server 3 stores the received schedule data in association with a schedule used to display these schedule data and the identification code used to identify the source shopping street in the schedule database 333. Schedule data may be input by each shop. When schedule data are registered for each shop, these data are stored in associated with not only the identification code used to identify the shopping street but also an identification code used to identify the shop.

The supervisor or entrant can register update information via a mail message using the portable terminal 7. Upon registering update information using a mail message, a mail generation function of the portable terminal 7 is used to generate a mail message. The mail message is generated in accordance with a format specified in advance by the patrol search means 32*b*. For example, data "closed today. We'll be open tomorrow" and a schedule that requires to upload that data are described as document data, as shown in FIG. 3. Of course, data may be displayed instantly if no schedule is described. The mail message can contain attached files such as a still picture file, movie file, audio file, and the like. As the sender of the mail message, the mail message includes one or both of the identification codes of the shopping street and shop. The generated mail message is transmitted to the mail server 4 via the wireless communication network 9. The mail server 4 stores the received mail message in a mail box in association with the identification code of the shopping street or shop. In this manner, registration of update information via the mail message is complete. Of course, data can be similarly registered from not only the portable terminal 7 but also a desktop type terminal.

The supervisor or entrant can register update information using the supervisor personal computer 5 or entrant personal computer 6. For example, a recording medium that records a file including update information is set in the recording medium reader of the supervisor personal computer 5 or entrant personal computer 6. The file including the update information is stored in a format that allows a patrol search of the patrol search means 32*a*. More specifically, such file is formed by appending the identification code used to identify the shopping street or shop and a schedule that requires to upload to data of a document and the like to be uploaded onto the home page in a predetermined format. Note that a predetermined directory of a storage device such as another magnetic disk other than the recording medium reader may be set in advance as a patrol search place.

In this manner, preparation such as registration of data required to make a patrol search and the like is complete.

When the user sends a home page transmission request to the page management server 3 together with a URL of the shopping street, the page management server 3 generates an HTML document used to display the home page corresponding to that URL.

Figure 5:
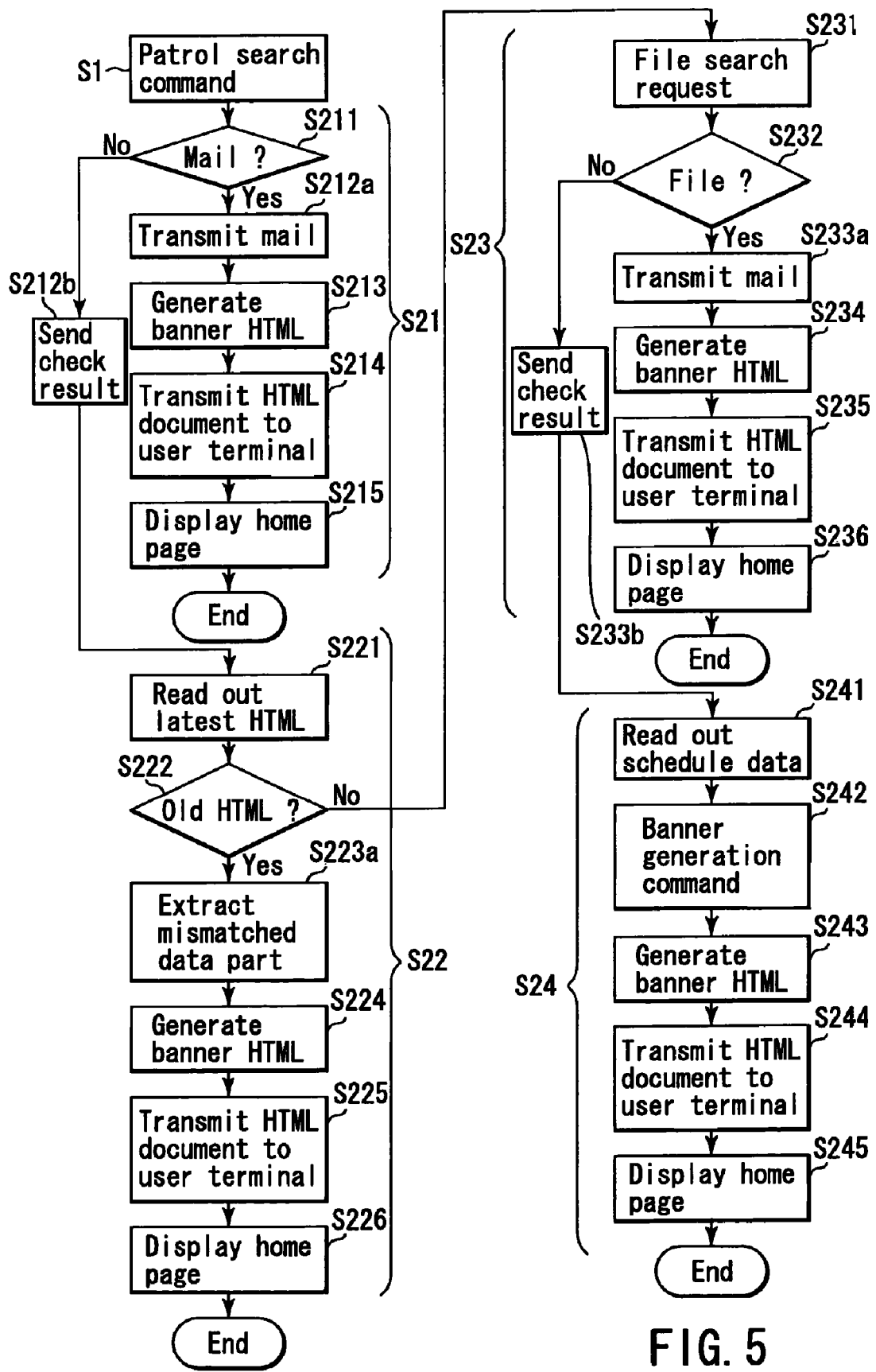
FIG. 5 is a flow chart showing a sequence for generating an HTML document according to the embodiment shown in FIG. 1.

The generation sequence of a HTML document will be described below using the flow chart of FIG. 5.

The home page management means 32*a* issues a patrol search command to the patrol search means 32*b* (s1). The patrol search means 32*b* executes a patrol search process in the predetermined patrol search order on the basis of the identification code of the shopping street as an object of the patrol search command (s2). For example, when the patrol search order is set in the order of mail search, home page search, PC search, and schedule data search, the patrol search means 32*b* executes a mail search process first (s21). In the mail search process, the patrol search means 32*b* issues a mail transmission request to the mail server 4 via the communication network 2. In response to this request, the mail server 4 determines whether or not a mail message with the identification code of the shopping street or shop as an object of that mail transmission request is stored (s211). If such mail message is stored, the mail server 4 transmits that mail message to the page management server 3 (s212*a*). If no mail message is stored, the mail server 4 transmits a check result indicating that no mail message is stored to the page management server 3 (s212b), and the flow advances to the next patrol search process (s22).

If it is determined that the mail message is stored as in (s212a), the patrol search means 32b sends a banner generation command based on update information contained in the received mail message to the banner generation means 32c. The banner generation means 32c generates banner HTML data using update information contained in the mail message as an image or based on still picture data, movie data, audio data, and the like contained in the attached file on the basis of the banner generation command (s213). The banner data is set with a URL or the like which indicates a resource of detailed information of the objective shopping street or shop as hyperlink information.

Figure 6:
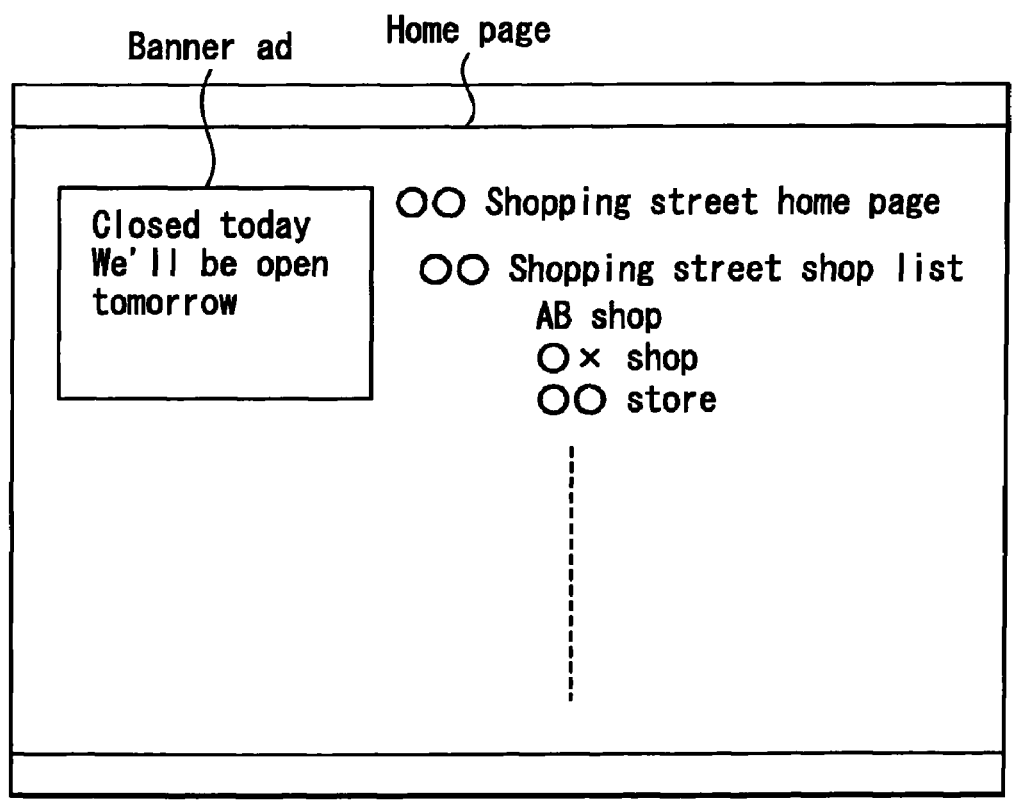
FIG. 6 shows an example of a display window on a user terminal according to the embodiment shown in FIG. 1.

The home page management means 32a links the generated banner HTML data and the HTML document pre-stored in the home page database 332 by, e.g., embedding the banner HTML data, and transmits the HTML document containing the banner data to the user terminal (s214). The WEB browser of the user terminal 8 displays a home page on the display on the basis of the received HTML document (s215). In this case, since the HTML document contains the banner data, update information designated by the mail message is displayed as a banner advertisement. FIG. 6 shows an example of the display window on the user terminal 8. A shown in FIG. 6, a banner advertisement that describes "closed today. We'll be open tomorrow" as the update information registered in advance using the mail message is displayed on the home page of the shopping street.

When the user selects this banner advertisement on the display, a transmission request of a file of a home page that indicates detailed information of the shopping street or shop, which is associated with that banner advertisement in advance, is transmitted from the user terminal 8 to the page management server 3, and the home page of the detailed information is displayed.

If no mail message is found as in (s212b), the flow advances to (s22), and the patrol search means 32b executes a home page search process. More specifically, an HTML document or the like which is associated with the identification code used to identify the corresponding shopping street or shop is read out from the home page database 332. The home page database 332 also stores HTML documents before update. Hence, the latest HTML document is read out based on update date & time data of HTML documents (s221). It is then determined whether or not HTML documents which have update times within a predetermined period of time (e.g., 48 hours) before the current time are found (s222). If such HTML documents are found, data parts which do not match these HTML documents are extracted (s223a). If no HTML document is found, the flow advances to (s23). The data part extraction process is executed for, e.g., respective tags in an HTML document. Also, match/mismatch determination is executed not only for HTML documents but also for attached files such as still picture files, movie files, and the like. The attached files can undergo match/mismatch determination with reference to their file names, file sizes, and the like. The patrol search means 32b sends a banner generation command which contains newly updated information in that mismatched data part as update information to the banner generation means 32c. The banner generation means 32c generates banner HTML data based on this banner generation command (s234) in the same manner as (s213). This banner data is set with a URL or the like which indicates a resource of detailed information of the objective shopping street or shop as hyperlink information.

The home page management means 32a links the generated banner HTML data and the HTML document pre-stored in the home page database 332 by, e.g., embedding the banner HTML data, and transmits the HTML document containing the banner data to the user terminal (s225). The WEB browser of the user terminal 8 displays a home page on the display on the basis of the received HTML document. In this case, since the HTML document contains the banner data, update information designated by the mail message is displayed as a banner advertisement, as shown in, e.g., FIG. 6 (s226).

If no updated HTML document is found in (s222), the flow advances to (s23), and the patrol search means 32b executes a PC search process. More specifically, the patrol search means 32b issues a file search request to the supervisor personal computer 5 or entrant personal computer 6 assigned with the identification code used to identify the corresponding shopping street or shop (s231). In response to this file search request, a predetermined directory of a recording medium of a built-in recording medium reader or the like is searched to see if a file in the predetermined format is stored (s232). The predetermined format corresponds to, e.g., data of a CSV format. If an objective file is found, that file is transmitted to the page management server 3 (s233a). If no file is found, a check result indicating that no file is found is transmitted to the page management server 3 (s233b). In case of (s233b), the process in the page management server 3 advances to a schedule data search process in (s24).

The patrol search means 32b which received the file in (s233a) issues a banner generation command which contains information included in the received file as update information to the banner generation means 32c. The banner generation means 32c generates banner HTML data based on this banner generation command (s224) in the same manner as (s213) or the like. This banner data is set with a URL or the like which indicates a resource of detailed information of the objective shopping street or shop as hyperlink information.

The home page management means 32a links the generated banner HTML data and the HTML document pre-stored in the home page database 332 by, e.g., embedding the banner HTML data, and transmits the HTML document containing the banner data to the user terminal (s235). The WEB browser of the user terminal 8 displays a home page on the display on the basis of the received HTML document. In this case, since the HTML document contains the banner data, update information designated by the mail message is displayed as a banner advertisement, as shown in, e.g., FIG. 6 (s236).

In (s24), the patrol search means 32b reads out schedule data associated with a schedule corresponding to the current time of those stored in the schedule database 333 (s241). The patrol search means 32b issues a banner generation command which contains the readout data as update information to the banner generation means 32c (s242). The banner generation means 32c generates banner HTML data based on this banner generation command (s243) in the same manner as (s213) or the like. This banner data is set with a URL or the like which indicates a resource of detailed information of the objective shopping street or shop as hyperlink information.

The home page management means 32a links the generated banner HTML data and the HTML document pre-stored in the home page database 332 by, e.g., embedding the banner HTML data, and transmits the HTML document containing the banner data to the user terminal (s244). The WEB browser of the user terminal 8 displays a home page on the display on the basis of the received HTML document. In this case, since the HTML document contains the banner data, update information designated by the mail message is displayed as a banner advertisement, as shown in, e.g., FIG. 6 (s245).

By repeating the aforementioned process, the home page is automatically updated.

As described above, according to this embodiment, the home page can be automatically updated by only making simple data registration processes such as an update process of a mail message and home page, a data registration process to the PC, a schedule data registration process, and the like. Since the priority order of data to be updated is determined in advance, and update data are searched for in turn in that priority order, the home page can be updated using the latest information. In this way, since the latest information is ready to be uploaded all the time, the access count can be increased without losing interest in the home page for visitors. Also, since the update process is easy, a plurality of home pages can be automatically updated at the same time.

The present invention is not limited to the above embodiment.

In the above example, a banner advertisement to be embedded and displayed on the home page is displayed on the basis of update data. Also, other parts of a home page such as a document, image, and the like other than the banner advertisement can be updated. More specifically, an HTML document which contains update data is generated, an appended file, which is appended to update data, is linked to an HTML document, and so forth.

Information exchange between the servers and terminals may be attained by either wireless or wired communications.

In the above example, HTML is used as the markup language. However, the present invention is not limited to such specific language, and can be applied to other markup languages such as XML, SGML, and the like.

As the identification code described in the above embodiment, a URL used to identify the shopping street or shop may be used.

FIG. 4 shows the concept of schedule data. An image corresponding to such conceptual rendering may be provided in response to access from the supervisor personal computer 5, entrant personal computer 6, user terminal 8, or the like, and may be displayed on the display of the personal computer 5 or 6, user terminal 8, or the like. More specifically, the home page management means 32*a* generates image data, which is formed by time-serially assigning schedules and their update data on the outer surface of a cylindrical three-dimensional image, as shown in FIG. 4, and transmits it to the personal computer 5 or 6, or the user terminal 8. Upon receiving the image data, the personal computer 5 or 6, or the user terminal 8 can display a schedule conceptual image on the display on the basis of the image data. With an operation using an input device such as a mouse, keyboard, or the like on the personal computer 5 or 6, or the user terminal 8, the cylindrical image can be rotated. In this case, a program for rotating the cylindrical image in response to a rotation operation from the input device is preferably launched on the personal computer 5 or 6, or the user terminal 8. Such program may be sent from the page management server 3 on the basis of a request from the personal computer 5 or 6, or the user terminal 8. In this way, by displaying a rotatable image, topics about the schedule setup can be provided, and the schedule setup or confirmation can be made like hacks of TV games. Information about a shopkeeper of a shop, who set the schedule, may be provided to the user terminal 8 in response to a request from the user terminal 8, and may be displayed on the user terminal 8.

Although not particularly described in the above embodiment, the supervisor and entrant can freely set the patrol time, patrol order, patrol count, patrol ON/OFF setup, and the like of the patrol search means 32*b* from the supervisor personal computer 5, entrant personal computer 6, and the like. These setup data are transmitted to the page management server 3, and are stored in a database (not shown). The processor 32 executes a home page management process, patrol search process, and the like in accordance with the condition specified by the setup data stored in this database.

As described above, according to the present invention, a home page can be easily automatically updated.

What is claimed is:

1. A system for automatically updating a home page comprising:

an update computer terminal configured to provide a content file including an advertisement content on the home page and a first identifying item specifying the home page, and a mail message including a second identifying item specifying the home page, a request of updating the home page and a update file;

a home page management server including a processor and a memory, and the home page management server being connected to a user terminal provided with a web browser and the update computer terminal though a communication network, the home page management server transmitting HTML document data to the user terminal to provide the home page on the user terminal in response to a transmission request of transmitting the HTML document data from the web browser of the user terminal, the HTML document data provided with banner data relating to the advertisement content; and a mail server connected to the update computer terminal and the home page management server though the communication network, which receives the mail message from the update computer terminal and stores the mail message;

wherein the home page management server includes:

a home page data base storing the HTML document data and the banner data for the home page and the content files transferred from the update computer terminal, new HTML document data being transferred from the update computer terminal and being stored in the home page data base;

a schedule data base storing schedule data including a date item which relates to a update of the advertisement contents and specify one of the content files;

a home page management unit reading out the HTML document data from the home page data base in response to the transmission request from the web browser of the user terminal, and transmitting the readout HTML document data to the user terminal, the home page management unit receiving the content file from the update computer terminal, and transferring the content file to the home page data base, wherein the home page management unit updates the home page utilizing the HTML document data stored in the home page data base in response to a update request from the update computer terminal;

a patrol search unit patrolling the mail server, the update computer terminal, the home page data base and the schedule data base, in this order, to search for the request of updating the home page, the first and second identifying items, the date item to extract the updated content files, and the updating files relating to the request of updating the home page and the first and second identifying items, a patrol timing and a number of times that patrol is to be carried out being determined based on the order of priority for accessing the mail server, the home page data base, the update computer terminal, and the schedule data base, the patrolling of the patrol search unit is finished after a first file is searched from the updated one of the content files and the updating files in the patrolling the mail server, the update computer terminal, the home page data base, and the schedule data base in the patrol order; and a banner generating unit generating the banner data with utilizing the first file to update HTML document data with the banner data which is incorporated in the HTML document data with reference to the schedule data at the patrol timing;

wherein the update computer terminal is allowed to set the patrol timing, number of times patrol is to be carried out, and setting regarding whether or not to cause the patrol to be carried out.

2. A system according to claim 1, wherein the home page management server receives the mail message in accordance with a reception process of a mail message includes a process for sending a mail transmission request to the mail server, and a reception process of a mail message from the mail server.

3. A system according to claim 1, wherein the home page management unit extracts a updated HTML document data stored in the home page data base in accordance with a process for reading out a latest first HTML document data and a second HTML document data having an update time a predetermined period of time before the current time from the home page data base, and a process for extracting a mismatched data part of the first and second HTML document data.

4. A system according to claim 1, wherein the patrol search unit sends a file search request through the management unit to the update computer terminal, and a reception process of an update file from the update computer terminal.

5. A system according to claim 1, wherein the schedule database sets with a predetermined cycle period, and updates the content data associated with the schedule database, and the search process of schedule data in the schedule database includes a search process of schedule data associated with a schedule corresponding to the current time.

* * * * *